United States Patent [19]

Sawasaki et al.

[11] Patent Number: 5,056,380
[45] Date of Patent: Oct. 15, 1991

[54] HYDRAULIC CONTROL SYSTEM FOR STEPLESSLY VARIABLE TRANSMISSION

[75] Inventors: Tomoo Sawasaki; Chitoshi Morishige, both of Hiroshima, Japan

[73] Assignee: Mazda Moor Corporation, Hiroshima, Japan

[21] Appl. No.: 658,466

[22] Filed: Feb. 22, 1991

Related U.S. Application Data

[63] Continuation of Ser. No. 400,922, Aug. 30, 1989, abandoned.

[30] Foreign Application Priority Data

Aug. 30, 1988 [JP] Japan .................. 63-213722
Jan. 19, 1989 [JP] Japan .................. 1-10431

[51] Int. Cl.⁵ .............................. B60K 41/12
[52] U.S. Cl. .............................. 74/866; 74/867
[58] Field of Search .............. 74/866, 867, 868, 869; 474/69, 70

[56] References Cited

U.S. PATENT DOCUMENTS

| | | | |
|---|---|---|---|
| 4,519,790 | 5/1985 | Yamamuro et al. | 474/70 |
| 4,579,021 | 4/1986 | Yamamuro et al. | 74/869 |
| 4,686,871 | 8/1987 | Kobayashi | 74/869 |
| 4,735,113 | 4/1988 | Yamamuro et al. | 74/867 X |
| 4,785,689 | 11/1988 | Iwatsuki et al. | 74/867 X |
| 4,794,819 | 1/1989 | Tanaka et al. | 74/868 X |
| 4,811,225 | 3/1989 | Petzold et al. | 74/867 X |
| 4,819,514 | 4/1989 | Yamamuro et al. | 74/868 |
| 4,829,433 | 5/1989 | Nakano et al. | 74/867 X |
| 4,854,920 | 8/1989 | Mimura | 74/868 X |

FOREIGN PATENT DOCUMENTS 58-88252 5/1983 Japan .

Primary Examiner—Allan D. Herrmann
Assistant Examiner—Benjamin Levi
Attorney, Agent, or Firm—Fleit, Jacobson, Cohn, Price, Holman & Stern

[57] ABSTRACT

A steplessly variable power transmission has a torque converter provided with an input member connected with an engine output member of an engine and an output member. A belt-pulley type of steplessly variable power transmitting mechanism is provided with primary pulley device, connected with the output member of the torque converter. A secondary pulley device, constituting an output member of the transmission, is also provided and a belt connects the primary pulley devices with the secondary pulley device for transmitting power between the primary and secondary pulley device with a predetermined pulley speed ratio. A hydraulic control system controls effetive diameters of the primary and secondary pulley devices to thereby change the speed ratio of the transmission steplessly. An output torque of the torque converter or a turbine torque of the torque converter, and the pulley speed ratio are calculated. A line pressure of the hydraulic control system is controlled in accordance with signals representing the output or turbine torque and pulley speed ratio to control the effective diameter so that a slippage of the belt can be effectively prevented.

10 Claims, 18 Drawing Sheets

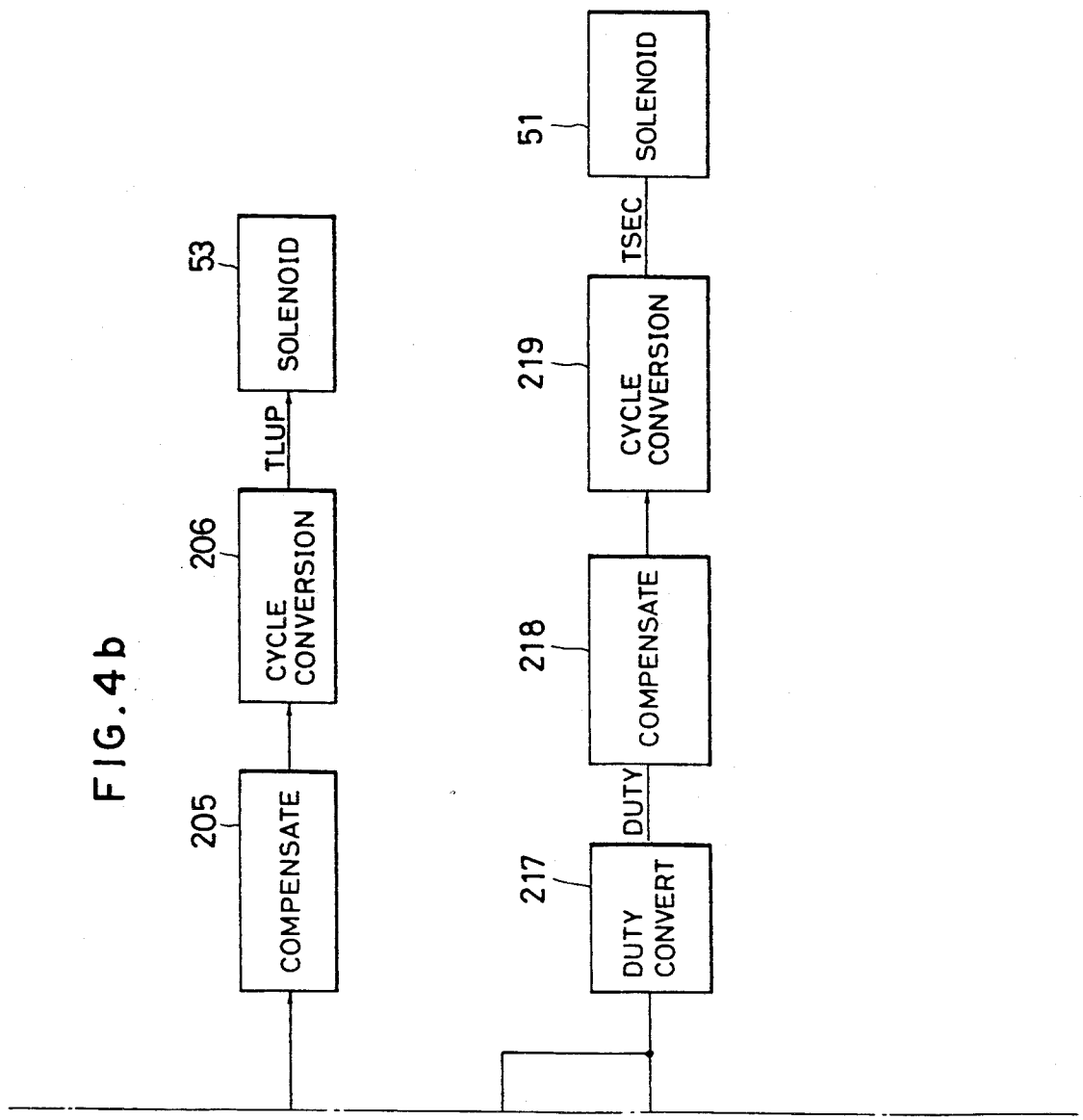

HYDRAULIC CONTROL SYSTEM FOR STEPLESSLY VARIABLE TRANSMISSION

This is a continuation of application Ser. No. 07/400,922, filed Aug. 30, 1989, now abandoned.

CROSS-REFERENCE TO THE RELATED APPLICATIONS

The present application relates to co-pending U.S. patent application Ser. Nos. 298,971, filed on Jan. 19, 1989, now U.S. Pat. No. 4,875,892, and 302,198, filed on Jan. 27, 1989, now abandoned, which are commonly assigned to the same assignee as the present invention.

BACKGROUND OF THE INVENTION

1. Field of the Invention

The present invention relates to a hydraulic control system for a steplessly variable power transmission.

2. Description of the Prior Art

There has been known a steplessly variable power transmission provided with a belt-pulley mechanism having a primary pulley device connected with an engine and a secondary pulley device connected with vehicle wheels wherein an engine power is transmitted from the primary pulley device to the secondary pulley device with a predetermined pulley speed ratio therebetween through a belt member. Effective diameters of the primary and secondary pulley devices are controlled by a hydraulic mechanism for providing the predetermined pulley speed ratio.

Japanese Patent Public Disclosure No. 58-88252, laid open to the public on May 26, 1983, discloses a control method of a line pressure of the hydraulic mechanism of the steplessly variable power transmission wherein the line pressure of the hydraulic mechanism is determined in accordance with an engine output torque and the pulley speed ratio to improve a transmission efficiency and a durability of the belt member. The engine torque is determined in accordance with an engine operating condition in light of an engine output property memorized in a controller constituted by a micro computer.

In the conventional steplessly variable power transmission, the engine torque is transmitted to the belt-pulley mechanism through a torque converter disposed between the belt-pulley mechanism and the engine. As a result, a magnitude of input torque of the torque converter or the engine output torque does not always correspond to the output torque of the torque converter or an input torque of the belt-pulley mechanism. In detail, the torque converter functions to amplify the torque therethrough in a torque amplifying zone of a pump turbine speed ratio between a pump device connected with an engine output shaft and a turbine device connected with an output shaft of the torque converter. Therefore, the engine output torque is different from the output torque of the torque converter. It will be understood that there may be produced a slippage between the belt member and the pulley device because the line pressure of the hydraulic mechanism for controlling the diameter of the belt-pulley mechanism is controlled in accordance with the engine output torque or input torque of the torque converter rather than an input torque of the belt-pulley mechanism or output torque of the torque converter.

Where the line pressure is increased to prevent the belt-pulley mechanism from slipping, the line pressure may be maintained at an unduly high value in a fluid coupling zone in which no torque amplification occurs in the torque converter, unlike the torque amplifying zone, so that a head loss of a hydraulic pump and a friction loss between the belt member and pulley device are increased.

SUMMARY OF THE INVENTION

It is, therefore, an object of the present invention to provide a hydraulic control system of a steplessly variable power transmission which can control a line pressure thereof to provide an appropriate contact between a belt member and a pulley device of a transmission.

It is another object of the present invention to provide a hydraulic control system which can control the line pressure thereof to fully correspond to a value of a torque transmitted through the belt member of the transmission.

It is still another object of the present invention to provide a line pressure control system for a steplessly variable power transmission wherein the line pressure can be controlled in accordance with an output torque or turbine torque of a torque converter and a pulley speed ratio with a simple structure thereof.

It is further object of the present invention to provide an improved torque detecting system for detecting a torque transmitted through a torque converter with or without a lock-up clutch to thereby determine a line pressure of a hydraulic control system of the transmission.

The above and other objects of the present invention can be accomplished by a steplessly variable power transmission comprising a torque converter provided with a pump device having an input member connected with an engine output member of an engine and a turbine device having an output member. Belt-pulley type steplessly variable power transmitting means are provided with a primary pulley device connected with the output member of the torque converter. A secondary pulley device constitutes output means of the transmitting means, and belt means connects the primary pulley device with the secondary pulley device for transmitting power between the primary and secondary pulley device with a predetermined pulley speed ratio between the primary pulley device and the secondary pulley device. Hydraulic control means controls effective diameters of the primary and secondary pulley device to thereby change the pulley speed ratio of the transmission steplessly. First detecting means detects an output torque of the torque converter or a turbine torque of the torque converter, and second detecting means detects the pulley speed ratio. Line pressure control means controls a line pressure of the hydraulic control means in accordance with signals from the first and second detecting means so as to control the effective diameters.

In a preferred embodiment of the present invention, the torque converter is provided with lock-up clutch means to connect the input member and the output member so as to transmit the power directly therebetween in a predetermined engine operating condition. The improvement is provided with means for detecting a magnitude of a clutch torque transmitted through the lock-up clutch means based on an engine output torque and an engaging condition of the lock-up clutch means when the lock-up clutch means is engaged. The improvement is also provided with means for detecting the turbine torque of the torque converter based on the engine output torque and a torque ratio of the torque converter. In this embodiment, the line pressure of the hydraulic control means is controlled based on the clutch torque and the turbine torque.

The above and other features of the present invention will be apparent from the following description taking reference to the accompanying drawings.

DESCRIPTION OF THE PREFERRED EMBODIMENT

Structure of steplessly variable power transmission

Figure 1:
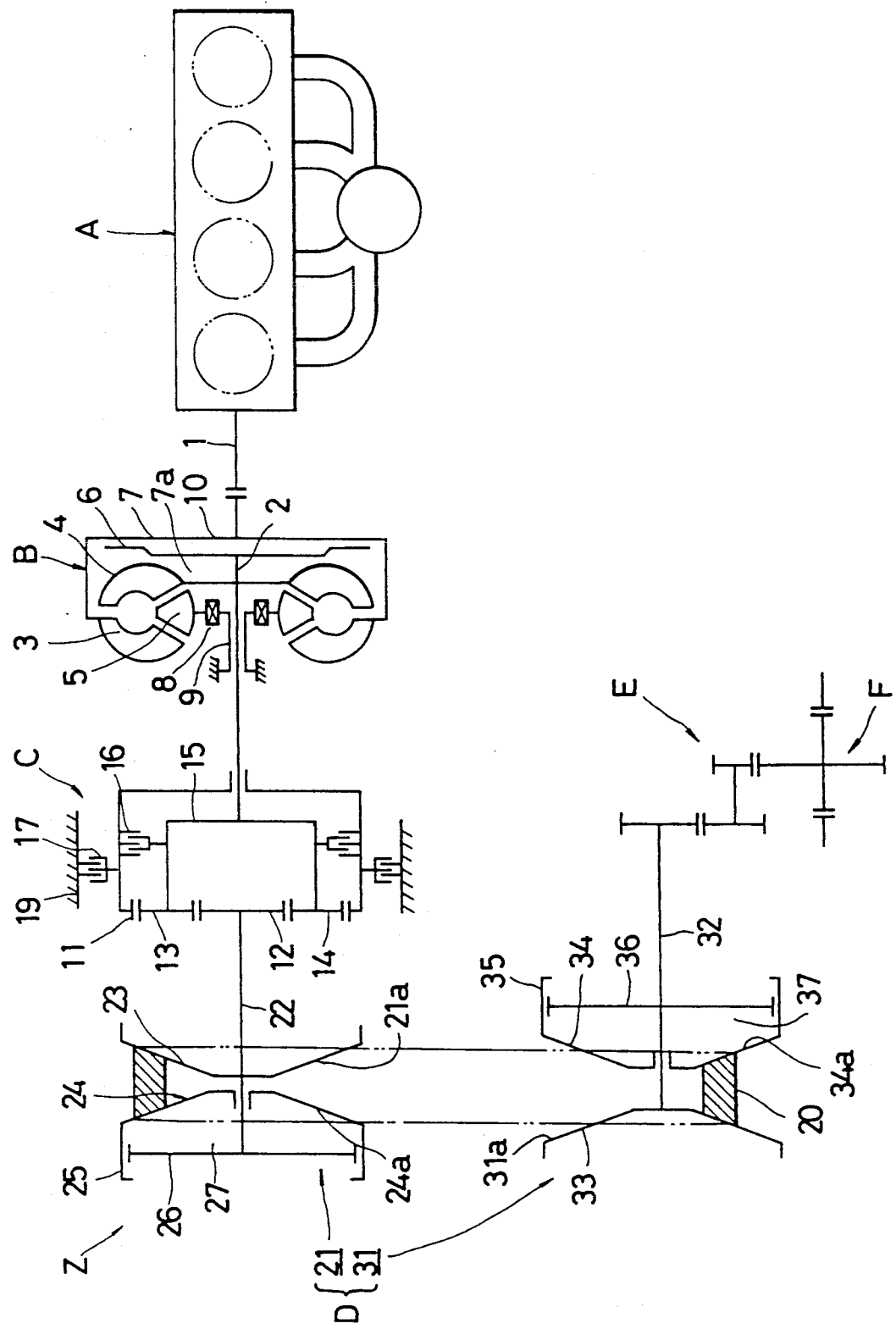
FIG. 1 is a schematic view of a skeleton of a steplessly variable power transmission in accordance with the present invention.
Figure 2:
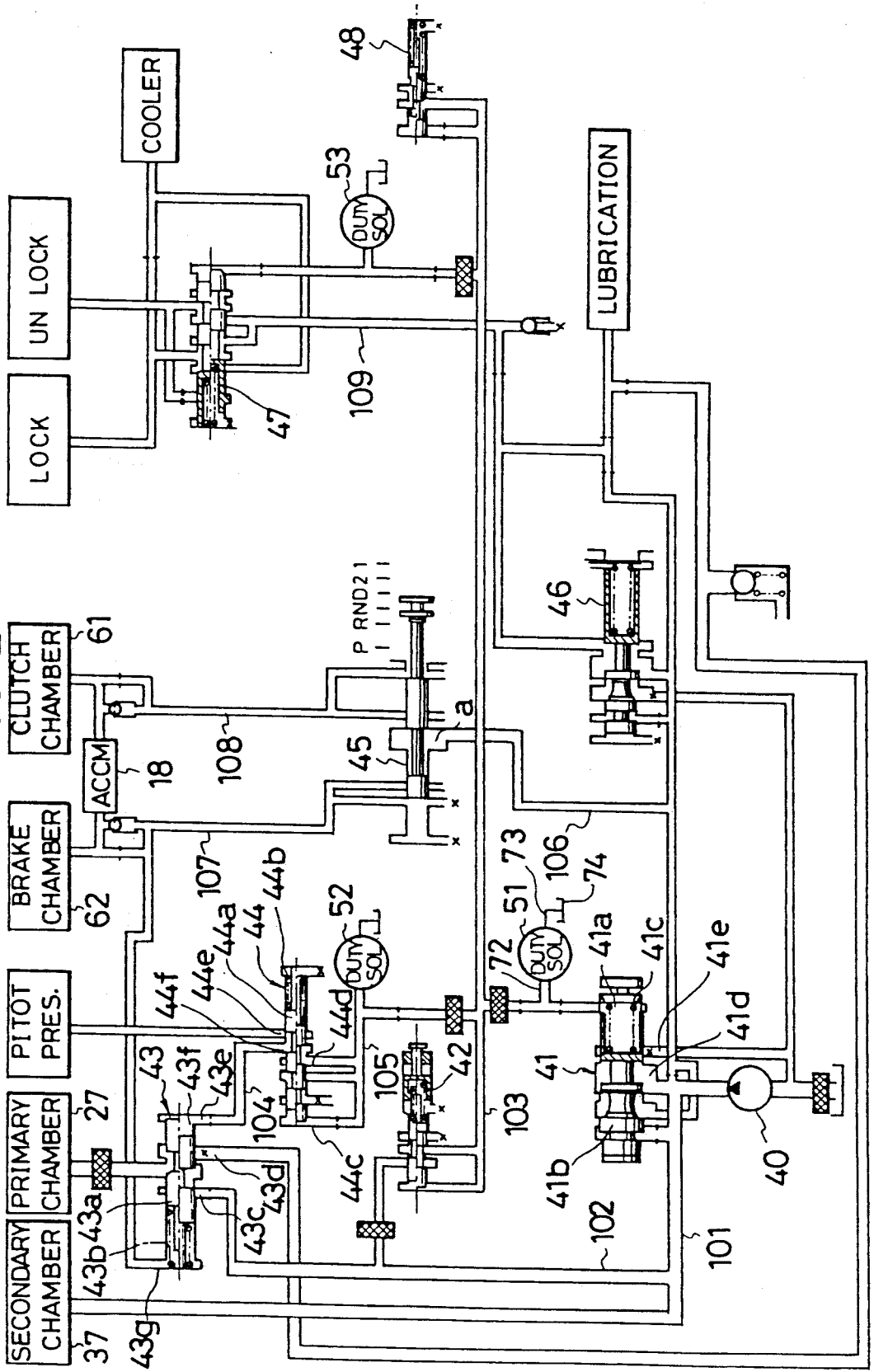
FIG. 2 is a view showing hydraulic control mechanism.

Referring the drawings, there is shown a skeleton of a steplessly variable power transmission Z in accordance with the present invention in FIG. 1 and a hydraulic control circuit Q therefor in FIG. 2. The illustrated transmission Z for a front wheel drive vehicle is provided with a torque converter B connected with an output shaft 1 of an engine A, a switching mechanism C for switching the vehicle between a forward movement and reverse movement of the vehicle between a forward movement therefor and a reverse movement, a belt-pulley mechanism D for transmitting a torque, a speed reduction mechanism E and a differential mechanism F.

Torque converter B

The torque converter B is provided with a pump impeller 3 fixed to a pump cover 7 which is coupled with an engine output shaft 1 so as to rotate with the output shaft 1, a turbine runner 4 arranged so as to face the pump impeller 3 for rotation within a converter chamber 7a which is defined by the pump cover 7, and a stator 5 disposed between the pump impeller 3 and the turbine runner 4 for amplifying the torque transmitted through the torque converter B. The turbine runner 4 is coupled with a carrier 15 which constitutes an input member of the switching mechanism C. The stator 5 is connected with a transmission case 19 through one way clutch 8 and a stator shaft 9. There is disposed a lock-up piston 6 slidably mounted on a turbine shaft 2 between the turbine runner 4 and the pump cover 7. The lock-up piston 6 and the pump cover 7 constitute a lock-up clutch. The slidable movement of the lock-up piston 6 on the turbine shaft 2 can be controlled by a hydraulic pressure of a lock-up chamber 10 to selectively establish a lock-up condition in which the lock-up piston 6 is engaged with the pump cover 7 so that the torque is transmitted through the lock-up clutch and a converter condition in which the lock-up piston is disengaged from the pump cover 7 so that the torque is transmitted through a converter fluid filled in the chamber 10.

It will be understood from foregoing that the engine torque is transmitted through the lock-up piston 6 at one hand and through the turbine runner 4 at the other hand. Both of them are necessary to be taken into account for detecting the torque transmitted to a primary shaft 22 of the belt-pulley mechanism D.

Switching mechanism C

The switching mechanism C is provided for switching a drive mechanism of the vehicle between the forward movement in which rotation of the turbine shaft 2 of the torque converter B is transmitted as a normal condition and the reverse movement in which the rotation of the turbine shaft 2 is transmitted as an inverted condition. The switching mechanism C is constituted by a double pinion type planetary gear unit. The carrier 15 is brought into a spline engagement with the turbine shaft 2. The carrier 15 is provided with a first pinion gear 13 and a second pinion gear 14 thereon. The first pinion gear 13 is brought into a spline engagement with a sun gear 12 which is brought into a spline engagement with the primary shaft of the belt-pulley mechanism D. There is disposed a clutch 16 between a ring gear 11 and the carrier 15 for controlling an engagement therebetween. A brake 17 is disposed between the ring gear 11 and the transmission case 19 for selectively fixing the ring gear 11 to the transmission case 19.

Accordingly, when the clutch 16 is engaged and the brake 17 is disengaged, the ring gear 11 is integrated with the carrier 15 and can rotate relative to the transmission case 19 so that the rotation of the turbine shaft 2 is transmitted toward the primary shaft 22 through the sun gear 12 as a normal rotation. Thus, the forward condition is established.

To the contrary, when the clutch 16 is released and the brake 17 is engaged the ring gear is fixed to the transmission case 19 and the ring gear 11 can rotate relative to the carrier 15 so that the rotation of the turbine shaft 2 is transmitted to the primary shaft 22 as an inverted rotation through the first and second pinion gear 13 and 14 and the sun gear 12. Thus, the reverse condition can be established.

That is, the clutch 16 and brake 17 are selectively actuated for the forward and reverse movements of the vehicle.

Belt-pulley mechanism D

The belt-pulley mechanism D is provided with a primary pulley 21 arranged rearward of the switching mechanism C and coaxially therewith, a secondary pulley 31 arranged in a spaced relationship from the primary pulley 21 and a belt 20 disposed between the primary and secondary pulleys 21 and 31.

Primary Pulley 21

The primary pulley 21 is provided with a stationary conical member 23 fixed on the primary shaft or input shaft 22 which is coaxially arranged with the turbine shaft 2 and brought into the splined engagement with the sun gear 12 of the switching mechanism C and a movable conical member 24 slidably mounted on the shaft 22 wherein conical surfaces thereof face to each other to form a substantially V-shaped groove 21a for receiving the belt 20. There is provided a hydraulic cylinder 25 fixed to an outer surface 24a of the movable member 24 opposite to the conical surface thereof. A piston 26 is slidably inserted into the cylinder 25 in an oil-tight relationship so that the piston 26 and the movable member 24 and the cylinder 25 define a primary chamber 27 into which a line pressure is introduced through the hydraulic circuit Q. When a hydraulic pressure of the chamber 27 is controlled to axially move the movable conical member 24 relative to the stationary member 23, an effective pitch diameter of the belt 20 is changed to control a pulley speed ratio between a primary pulley speed and a secondary pulley speed of the mechanism D wherein the pulley speed ratio substantially defines a speed ratio of the transmission Z.

Secondary pulley

The secondary pulley 31 has a similar structure to the primary pulley 21. The secondary pulley 31 is provided with a stationary conical member 33 fixed on a secondary shaft or output shaft 32 spaced from the primary shaft 22 and a movable conical member 34 slidably mounted on the shaft 32 wherein conical friction surface 34a of the movable conical member and a conical friction surface of the stationary conical member 33 face to each other to form a substantially V-shaped groove 31a for receiving the belt 20. There is provided a hydraulic cylinder 35 fixed to an outer surface 34b of the movable member 34 opposite to the conical friction surface 34a thereof. A piston 36 is slidably inserted into the cylinder 35 in a oil-tight relationship so that the piston 36 and the movable member 34 and the cylinder 35 define a secondary chamber 37 into which a line pressure is introduced through the hydraulic circuit Q. When a hydraulic pressure of the chamber 37 is controlled to axially move the movable conical member 34 relative to the stationary member 33, an effective pitch diameter of the belt 20 is changed to control the pulley speed ratio of the mechanism D.

It should be noted that a pressure area of the movable conical plate 34 on which the line pressure acts is smaller than that of the movable conical plate 24. Preferably, the pressure area of the movable conical plate 34 is approximately half of that of the movable conical plate 24.

The speed reduction mechanism E and the differential gear mechanism F can be constituted by a conventional mechanism well known to the public so that a detailed explanation thereto is omitted.

Hydraulic Control Circuit O

Referring to FIG. 2, hereinafter, there is described a hydraulic control circuit Q for controlling operations of the lock-up piston 6 of the torque converter B, the clutch 16 and the brake 17 of the switching mechanism C, primary pulley 21 and secondary pulley 31 of the belt-pulley mechanism D.

The hydraulic control circuit Q is provided with an oil pump 40 as a common source of the hydraulic pressure for the primary chamber 27 and the secondary chamber 37 and the like. A hydraulic fluid discharged from the pump 40 is adjusted by a line pressure regulator valve 41 at a predetermined value and introduced into the secondary chamber 37 of the secondary pulley 31 through the line 101 and into the primary chamber 27 of the primary pulley 21 through a line 102 separated from the line 101. The line pressure of the hydraulic control circuit Q is adjusted by controlling a pilot pressure introduced into a pilot chamber 41a of the regulator valve 41. The regulator valve 41 is provided with a spool 41b, a spring 41c for urging the spool 41b, and formed at a middle portion thereof with a pressure adjusting port 41d into which the hydraulic pressure from the pump 40 is directly introduced, and with a drain port 41e connected to a suction port of the oil pump 40. The hydraulic pressure is introduced through the line 102 into a reducing valve 42 in which the hydraulic pressure is reduced to a predetermined value, in turn, introduced to the pilot chamber 41a as a pilot pressure through the line 103. The hydraulic pressure of the line 101 acts on one end of the main spool 41b in one direction while a resilient force of the spring 41c and the pilot pressure act on the other end of the spool 41b in an opposite direction. The spool 41b is moved in accordance with a balance of the forces acting thereon so that a communication of the pressure adjusting port 41d with the drain port 41e is controlled. As a result, the hydraulic pressure in the line 101 or the line pressure is adjusted at a value corresponding to the pilot pressure. The pilot pressure is controlled by means of a first solenoid valve 51 provided on the line 103 and subjected to a duty ratio control. There is disposed a speed ratio control valve 43 controlled by the pilot pressure on the line 102. The control valve 43 is adapted to control the hydraulic pressure of the primary chamber 27 of the primary pulley 21 to thereby control the pulley speed ratio.

The speed ratio control valve 43 is provided with a spool 43a biased by a spring 43b, and formed with a line pressure port 43c, drain port 43d, pilot port 43e open to the a pilot chamber 43f at one end portion, and a reverse port 43g at the other end portion of the valve 43 where the spring 43b is located. The line pressure is introduced into the reverse port 43g through a shift valve 45.

In a forward condition wherein the shift valve 45 takes any one of positions D, 2 and 1, the hydraulic fluid is drained through the reverse port 43g and the shift valve 45 so that the spool 43a can make a slidable movement in an axial direction thereof by virtue of a pilot pressure introduced into the pilot chamber 43f. As a result, the line pressure port 43c and the drain port 43d are selectively communicated with the primary chamber 27 to perform the pulley speed ratio control.

In a reverse condition, the line pressure is introduced into the valve 43 through the reverse port 43g so that the spool 43a is urged against a right side wall of the chamber 43e and kept at the position. Thus, the line pressure port 43c is always communicated with the drain port 43d in the reverse condition so that the pulley speed ratio RATIO is fixed at the maximum value.

In the illustrated embodiment, there are equipped two separate pilot pressure supply systems for introducing the pilot pressure into the speed ratio control valve 43. The supply systems are selectively activated by a switching valve 44. The switching valve 44 is provided with a spool 44a and a spring 44b for biasing the spool 44a in one direction. The switching valve 44 is formed with a pilot port 44c at one end portion which is at an opposite side of the valve from the spring 44b. The pilot port 44c is joined to a line 105 separated from the line 103 so that the pilot pressure reduced by the reducing valve 42 is introduced into the valve 44 to act on one side of the spool 44a. At a middle portion of the valve 44, there are provided a first pilot pressure introducing port 44d communicated with a line 105 and a second pilot pressure introducing port 44e communicated with a pitot pressure generator (not shown) and a pilot pressure supply port 44f communicated with the pilot port 43e of the speed ratio control valve 43 through a line 104. A second solenoid valve 52 is arranged on the line 105 which is communicated with the first pilot introducing port 44d. The second solenoid valve 52 is adapted to control introduction of the pilot pressure to the pilot chamber 43f of the speed ratio control valve 43 in a manner that either a hydraulic pressure adjusted by the second solenoid valve 52 or the pitot pressure produced in proportion to an engine speed are selectively introduced into the chamber 43f.

The hydraulic pressure is introduced into a port 45a of the shift valve 45 through a line 106 after being adjusted by the regulator valve 41. Then, the hydraulic pressure is introduced into a brake chamber 62 of the brake 17 when a reverse shift position is selected. When a forward shift position is selected, the hydraulic pressure is introduced into a clutch chamber 61 of the clutch 16. In the illustrated embodiment, there is provided an accumulator 18 between the lines 107 and 108 for absorbing engaging and disengaging shock of the clutch 16 and the brake 17.

The hydraulic pressure is introduced into a clutch pressure adjusting valve 46 for adjusting the pressure to a clutch pressure of a predetermined value after adjusted by the regulator valve 41. Thereafter, the hydraulic pressure is introduced into a lock-up control valve 47. A pilot pressure of the lock-up control valve 47 is controlled by a third solenoid valve 53 so that the hydraulic pressure is selectively introduced into LOCK side wherein the lock-up clutch is engaged to establish the lock-up condition and UNLOCK side wherein the lock-up piston 6 is disengaged from the pump cover 7 to establish the torque converter condition.

There is provided a relief valve 48 at an end portion of the line 103.

Control Unit 78

There is provided a control unit 78 for controlling the first, second and third solenoid valves 51, 52 and 53.

Figure 3:
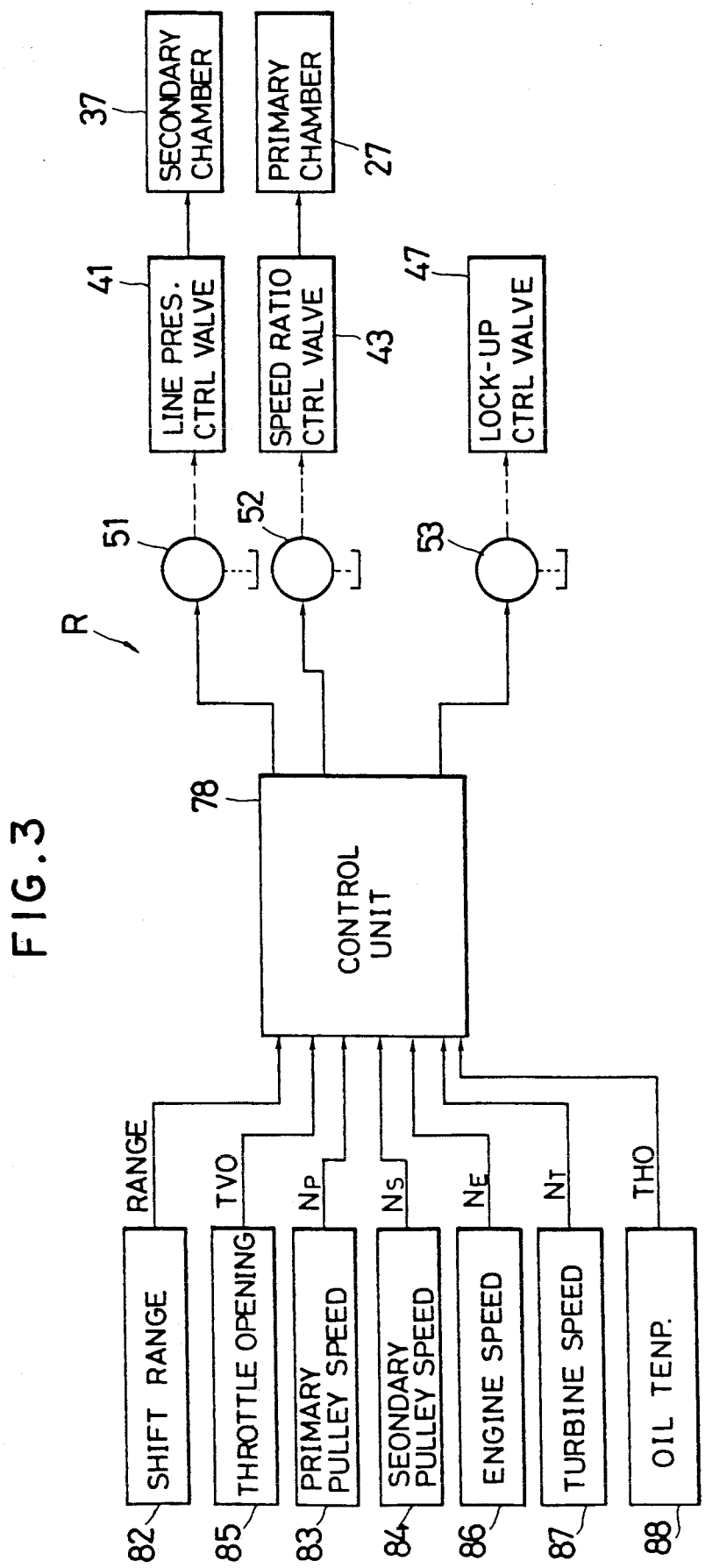
FIG. 3 is a block chart showing a control unit in accordance with a preferred embodiment of the present invention.

As shown in FIG. 3, the control unit 78 receives a signal RANGE from a shift range sensor 82 for detecting a shift range selected such as D, 1, 2, R, N and P, a signal Np from a primary pulley speed sensor 83 for detecting a rotation speed of the primary shaft 22, a signal Ns from a secondary pulley speed sensor 84 for detecting a rotation speed of the secondary shaft 32, a signal TVO from a throttle sensor 85 for detecting an opening of a throttle valve of the engine A, a signal Ne from a engine speed sensor 86 for detecting an engine speed, a signal Nt from a turbine speed sensor 87 for detecting a rotation speed of the turbine shaft 2 and a signal THO from a thermometer 88 for detecting a temperature of the hydraulic fluid of the hydraulic control circuit Q.

Figure 4A:
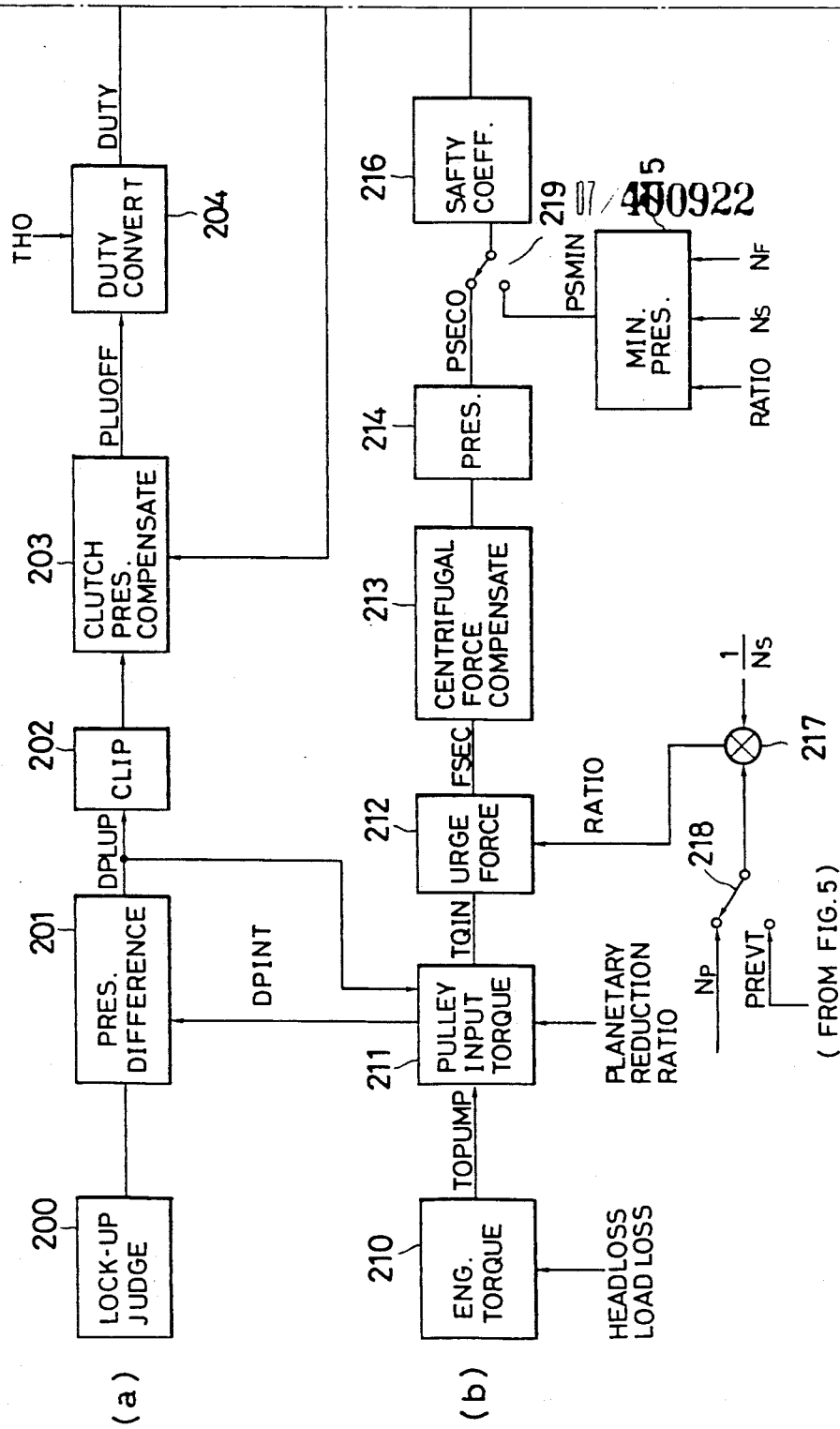
FIGS. 4 and 5 are block charts showing a control of various solenoid valves employed in the hydraulic control mechanism.
Figure 5:
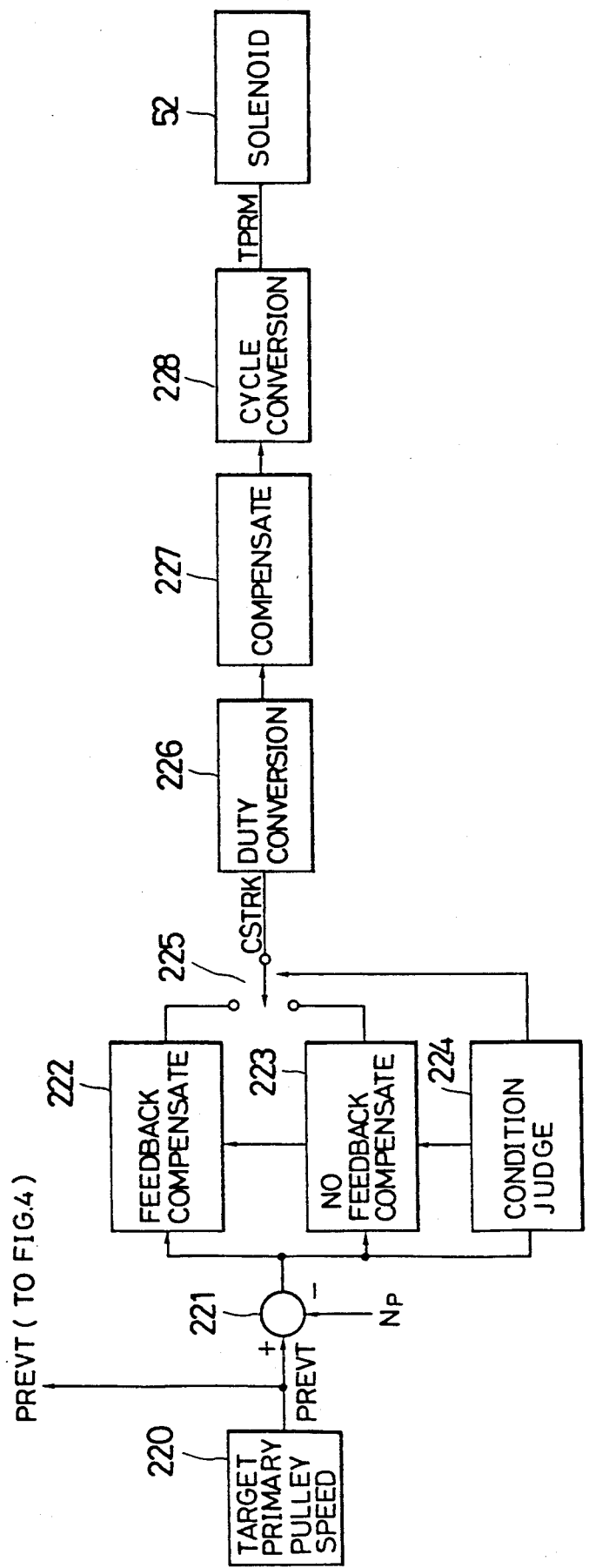

As shown in FIGS. 4 and 5, the control unit 78 receives signals from the above sensors and produces a duty signal TLUP to the third solenoid valve 53 for controlling the hydraulic pressure acting on the piston 6 or the pilot pressure of the regulator valve 41, a duty signal TSEC to the first solenoid valve for controlling the hydraulic pressure introduced into the secondary chamber 37 or a basic line pressure, and a duty ratio signal TPRM to the second duty solenoid valve 52 for controlling the hydraulic pressure acting on the primary chamber 27 or the pilot pressure of the switching valve 44.

Solenoid Control Valves 51, 52 and 53

Figure 6:
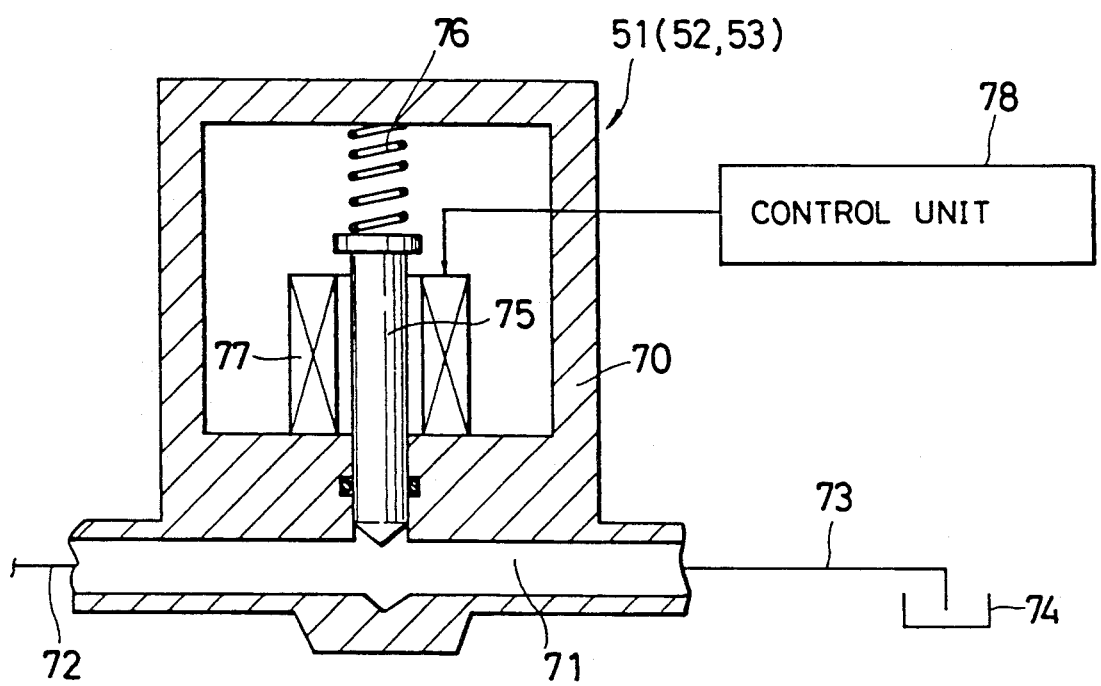
FIG. 6 is a sectional view of a solenoid valve controlled in accordance with a duty ratio.

The first solenoid control valve 51 is provided with a housing 70 as shown in FIG. 6. The housing 70 is formed with an oil passage 71 which is connected at one end with a line 72 separated from the line 105 and with a return line 73 to a reservoir tank 74 at the other end. A plunger 75 is arranged within the housing 70 for a reciprocating movement between an open position where the plunger 75 is retracted to open the oil passage 71 and a close position where the plunger 75 is projected to close the oil passage 71. The plunger 75 is urged toward the closed position by a spring 76. The plunger 75 is surrounded by a magnetic coil 77 to be displaced when the coil 77 is energized. The solenoids 52 and 53 have similar structures to the solenoid 51.

Control of Speed Ratio Control Valve 43

Figure 7:
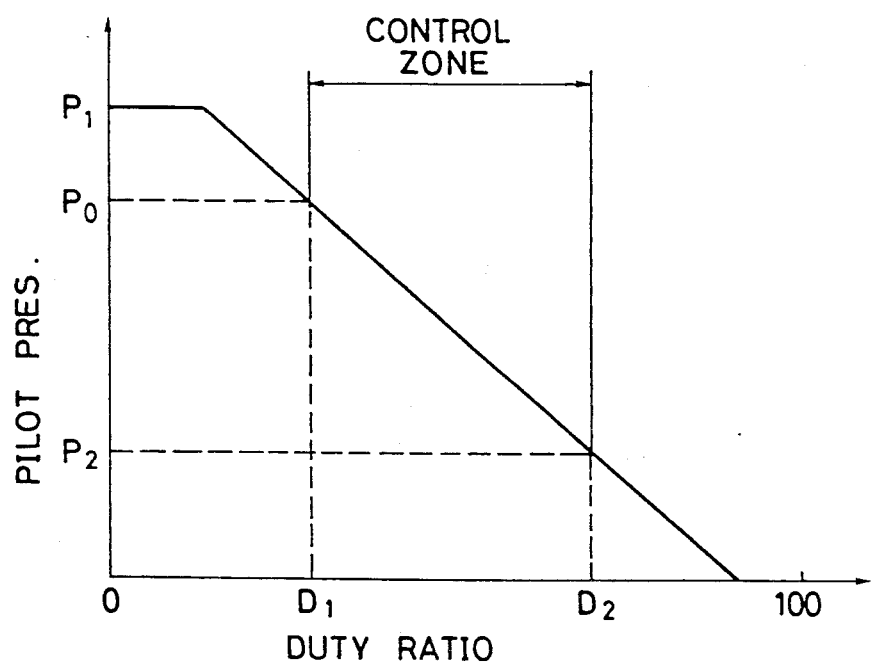
FIG. 7 is a chart showing a relationship between the duty ratio and pilot pressure for a control valve employed in the hydraulic control mechanism.

As shown in FIG. 7, the duty ratio of the second solenoid valve 52 changes from 0% to 100% while the hydraulic pressure in the line 105 changes from P1 to 0.

The spool 44a of the switching valve 44 is moved in the axial direction in accordance with the pilot pressure acting on the pilot port 44c so that the first pilot pressure introducing port 44d and the second pilot pressure introducing port 44e are selectively communicated with the pilot pressure supply port 44f. When the duty ratio of the second solenoid valve 52 is in a range from D1% to D2% or the pilot pressure thereof is in a range from P0 to P2, the first pilot pressure introducing port 44d is communicated with the pilot pressure supply port 44f and the second pilot pressure introducing port 44e is closed.

Figure 8:
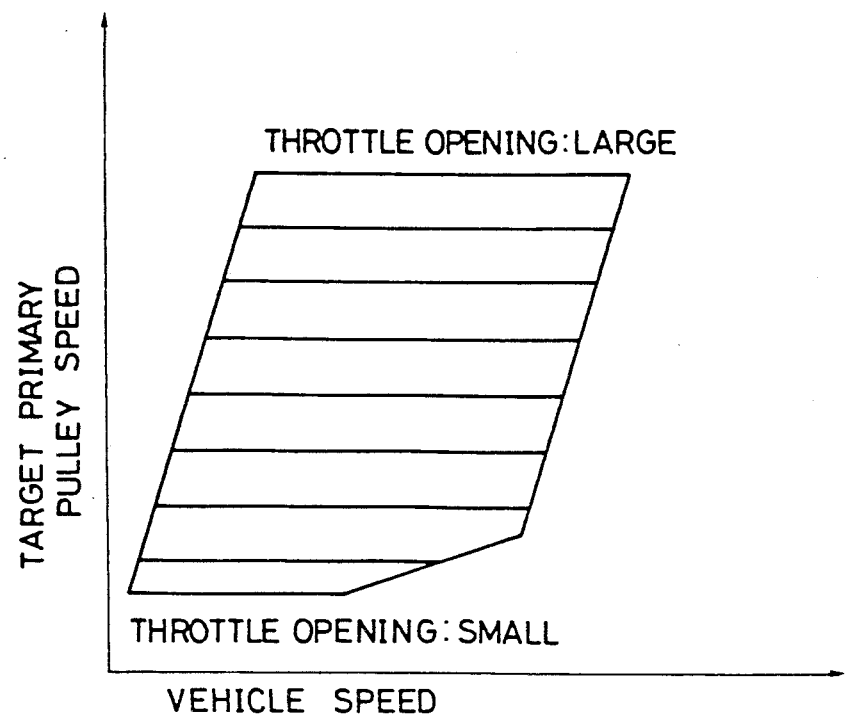
FIG. 8 is a chart showing a relationship between a target primary pulley speed and vehicle speed.

When the duty ratio of the second solenoid valve 52 is in a range from 0% to D1% or the pilot pressure ranges from P1 to P0 as shown in FIG. 7, the spool 44a is located at a right position as shown by an upper half portion thereof in FIG. 2 so that the first pilot pressure introducing port 44d is closed and the second pilot pressure introducing port 44e is communicated with the pilot pressure supply port 44f. The second solenoid valve 52 controls the pilot pressure of the speed ratio control valve 43 so that the speed ratio control valve 43 provides the primary chamber 27 with an appropriate hydraulic pressure which can accomplish a target primary pulley speed. The target primary pulley speed is determined from a map as shown by FIG. 8 based on a throttle opening, a vehicle speed or secondary pulley speed, and a shift gear stage.

Lockup Solenoid Control

Figure 9:
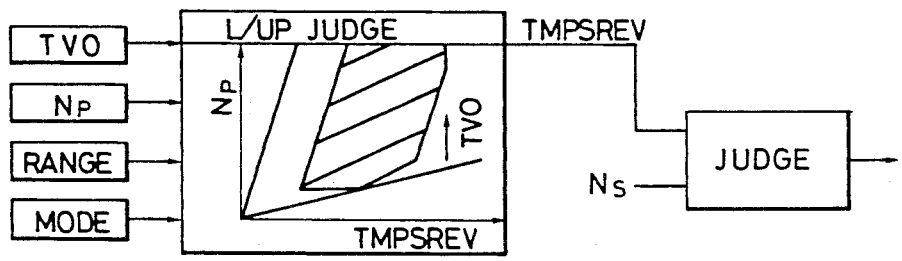
FIGS. 9-14 are block chart showing a procedure for obtaining a line pressure of the hydraulic control mechanism.

Referring to FIG. 4, the duty signal TLUP is produced in accordance with the following steps. In step 200, the control unit 78 judges, based on a map shown in FIG. 9, as to whether or not the engine operating condition is in a lock-up control zone wherein the lock-up clutch is controlled to be engaged.

Figure 10:
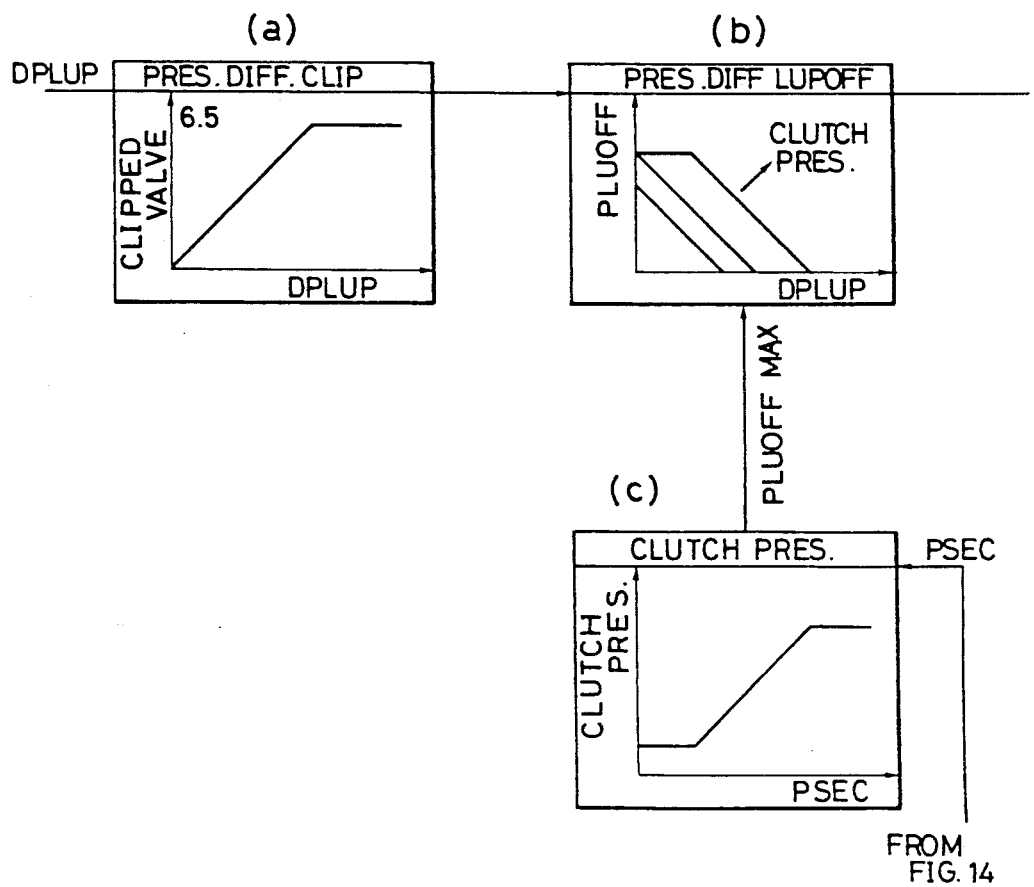

When the judgment is Yes or the engine operating condition is in the lock-up control zone, the control unit 78 calculates, in step 201, a lock-up clutch pressure difference DPLUP based on an initial value of a lock-up torque TQINT obtained from an engine output torque TQPUMP. The pressure difference DPLUP means a target value of a pressure difference in the piston 6. The value DPLUP is modified based on a map as shown in FIG. 10(a) in which the value DPLUP is clipped so as to prevent an excess hydraulic pressure from being introduced in step 202. The value DPLUP is modified in accordance with the line pressure PSEC which defines a hydraulic pressure introduced into the secondary chamber 37 in step 203. A maximum clutch pressure PLUOFFmax is obtained through a map as shown in FIG. 10(c) based on the line pressure PSEC. The signal DPLUP is converted to the clutch pressure PLUOFF based on a map as shown in FIG. 10(b) taking account of the maximum value PLUOFFmax. The clutch pressure PLUOFF is converted to a duty signal in step 204. In step 205, the duty signal PLUOFF is subject to a battery compensation. The compensated duty signal PLUOFF is converted to a pulse signal and introduced to the solenoid 53.

Pressure Control of the Primary Chamber

Figure 11:
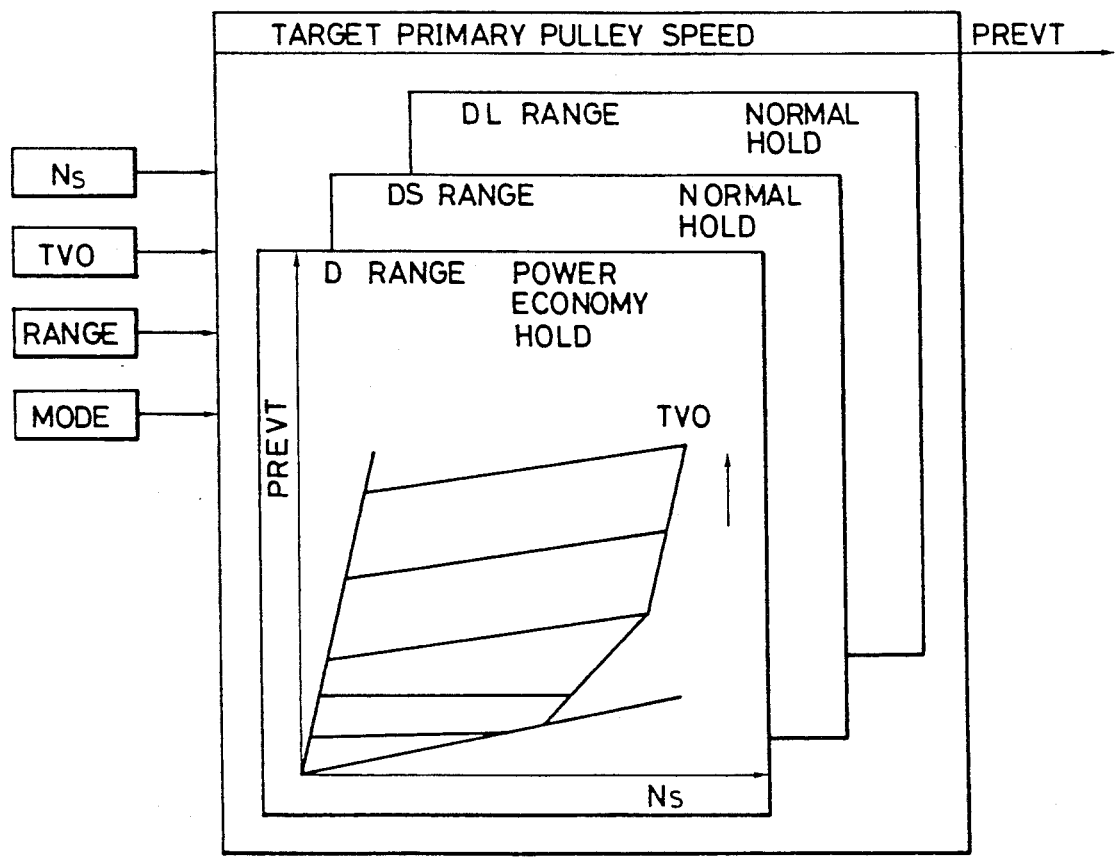

Referring to FIG. 5, the primary pulley speed PREVT is obtained from a map as shown in FIG. 11 based on a shift range signal RANGE denoting D, 2, 1, R and the like, throttle opening TVO, operation mode MODE, such as economy mode, power mode, normal mode and the like, secondary pulley speed Ns and the like in step 220. In step 221, the control unit 78 calculates a speed difference DNP between the target primary pulley speed PREVT and an actual primary pulley speed Np. In steps 222, 223, 224, the value DNP is subject to a modification by means of a feedback control or nonfeedback control in accordance with a judgment as to which modification should be carried out. A selector 225 is provided for selecting either output from the step 222 or output from the step 223. Thereafter the value PREVT is converted to the duty signal TPRM through steps 226, 227 and 228 as well as the steps 205, 206 and 107 in FIG. 4(a) and introduced into the solenoid 52.

Hydraulic Pressure Control of Secondary Chamber

The line pressure is introduced into the secondary chamber 37.

Figure 12:
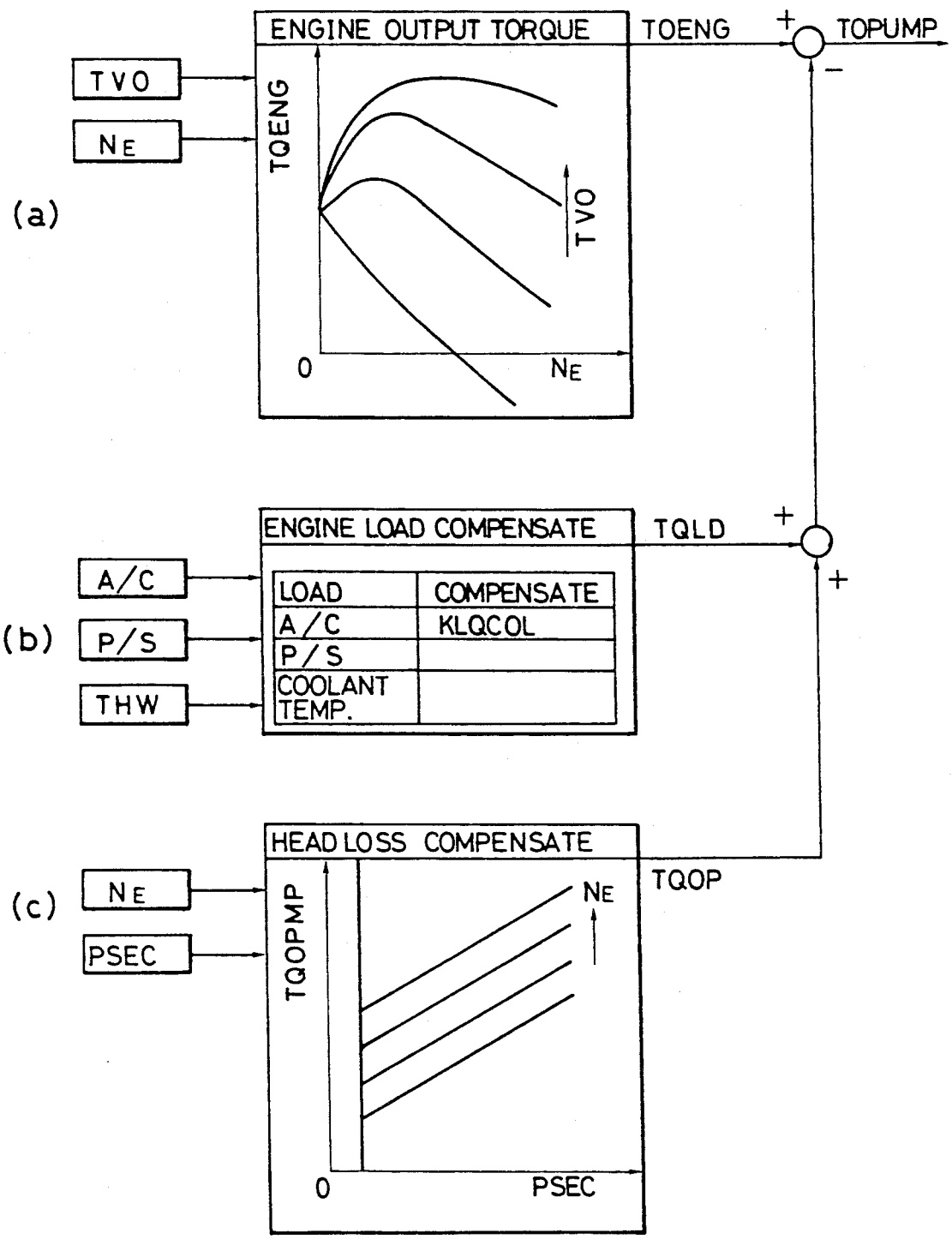

In step 210 of FIG. 4, the control unit 78 calculates a modified engine output torque TQPUMP. The value TQPUMP is obtained in a manner that an engine load compensation value TQLD and a pump loss compensation value TQOP are subtracted from the engine output torque TQENG obtained based on the throttle opening TVO and engine speed Ne as shown FIG. 12(a). As engine load compensation value TQLD, an operation of an air conditioner, power steering mechanism and engine coolant temperature THW are taken into account as shown FIG. 13(b). The pump loss compensation value TQOPMP is determined based on a map as shown in FIG. 12(c) in accordance with the line pressure PSEC to the secondary pulley and the engine speed Ne. In step 211 of FIG. 4, a torque value TQIN which is introduced from the switching mechanism C to the primary pulley 21 is calculated based on the modified engine output torque TQPUMP. In this process, the torque TQPUMP is obtained as a sum of a clutch torque TQLUP which is transmitted to the primary pulley 21 through the lock-up clutch and a converter torque TQCVD which is transmitted to the pulley through the hydraulic fluid and the turbine runner 4. In step 212, the control unit 78 calculates a biasing force FSEC for biasing the pulley based on the torque TQIN. The biasing force signal FSEC is subject to a centrifugal force compensation in step 213 and converted to a pressure value PSECO in step 214. In step 215, a minimum pressure value PSMIN which is necessary to carry out a shift operation based on the pulley speed ratio RATIO and the primary pulley speed Np is calculated. A selector 219 selects a larger value of the values PSMIN and PSECO. The signal TSEC for the solenoid 51 is obtained through the same procedure as the signal TLUP in steps 217, 218 and 219.

Calculation of Input Torque to the Primary Pulley

Figure 13:
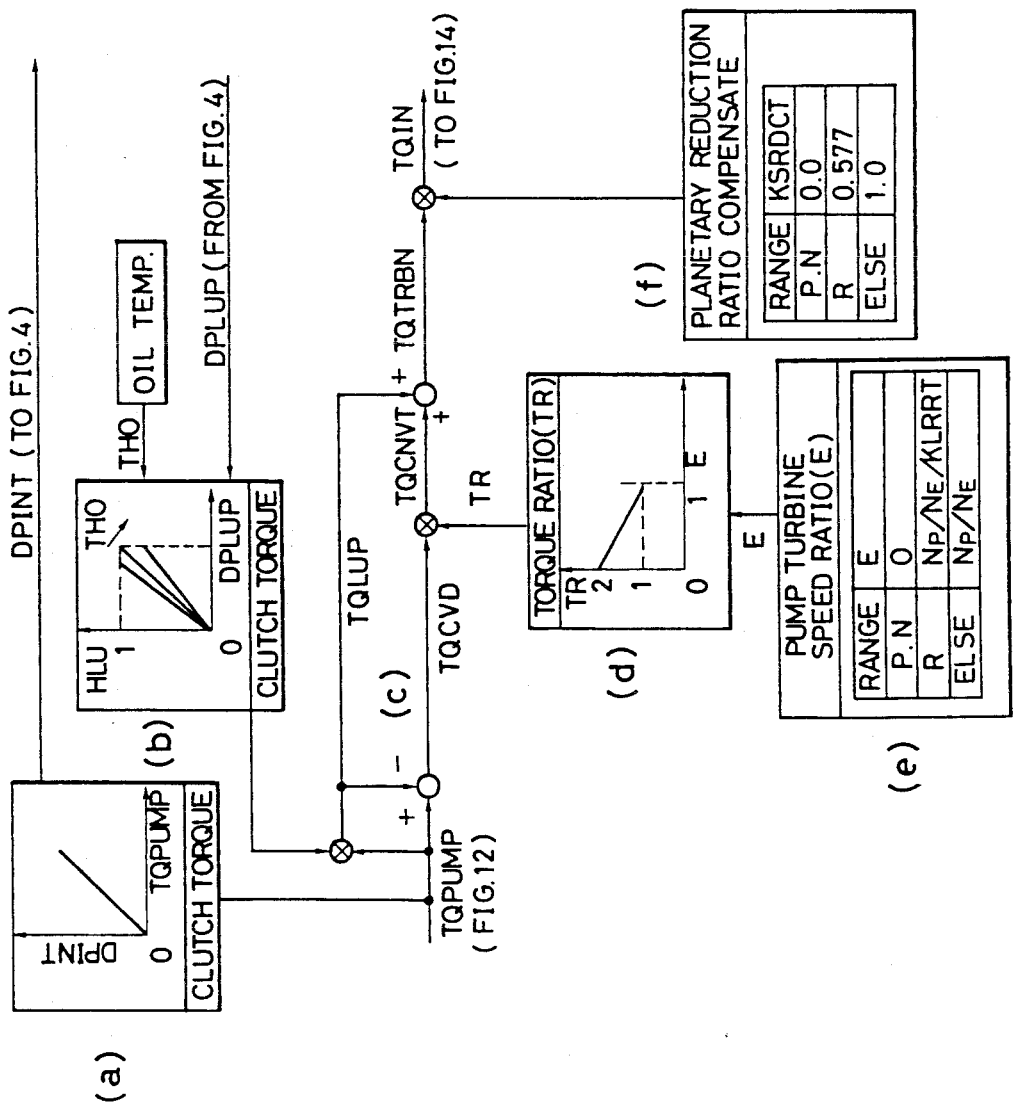

The control unit 78 calculates the initial value DPINT of the pressure difference of the piston 6 based on the engine output TQPUMP. The value DPINT is modified to the value DPLUP through the procedure shown in FIG. 9 in step 201 of FIG. 4. The torque transmitted to the piston 6 is affected by a viscosity of the hydraulic fluid in the converter chamber 7a so that a lock-up transmitting ratio Hlu is set in accordance with the temperature of the hydraulic fluid THO based on a map as shown in FIG. 13(b) wherein the torque transmitted to the piston 6 is decreased as the temperature THO is increased. The values Hlu ranges from 0 to 1. Therefore, an actual torque TQLUP transmitted to the piston 6 can be provided by the engine torque TQPUMP and the transmitting ratio Hlu.

$$TQLUP = TQPUMP * Hlu$$

Therefore, the engine torque introduced into the torque converter TQCVT can be provided as follows:

$$TQCVT = TQPUMP - TQLUP$$

Thus, the torque TQCNVT produced from the torque converter can be provided by employing a torque ratio TR shown in FIG. 13(d):

$$TQCNVT = TQCVT * TR = (TQPUMP - TQLUP) * TR$$

Accordingly, the total torque TQTRBN transmitted through the lock-up clutch and the torque converter can be provided as follows:

$$TQTRBN = TQLUP + TQCNVT$$

Since the switching mechanism C is provided with a planetary gear mechanism as a ratio reduction mechanism, a final torque TQIN can be provided by employing a reduction ratio SRDCT as follows;

$$TQIN = TQTRBN*SRDCT$$

The reduction ratio is shown in FIG. 13(f).

The torque ratio TR is a ratio of torque transmitted through the torque converter relative to input torque of the torque converter. The torque ratio TR can be provided by a pump turbine speed ratio E which is provided based on the primary pulley speed Np or a turbine speed of the torque converter B and the engine speed Ne or a pump speed of the torque converter B and the shift range RANGE as shown in FIG. 13(e). Namely, if the shift range RANGE is in P, N positions, the pump turbine speed ratio E is 0. In reverse position, the pump turbine speed ratio E is Np/Ne/KLRRT wherein KLRRT is a reduction constant in the reverse position. In other shift ranges ELSE, the pump turbine speed ratio E takes a value of Np/Ne.

Thereafter, the torque ratio TR can be obtained in light of a map as shown in FIG. 13(d) wherein the torque ratio TR takes a value 2 when the pump turbine speed ratio E is zero, reduces gradually as the pump turbine speed ratio E increases and when the pump turbine speed ratio E reaches about 0.8, the torque ratio TR converges to a value of 1 to be maintained thereafter.

Secondary Pressure PSEC

In steps 212 through 216 in FIG. 4, the secondary pressure PSEC is calculated.

Figure 14:
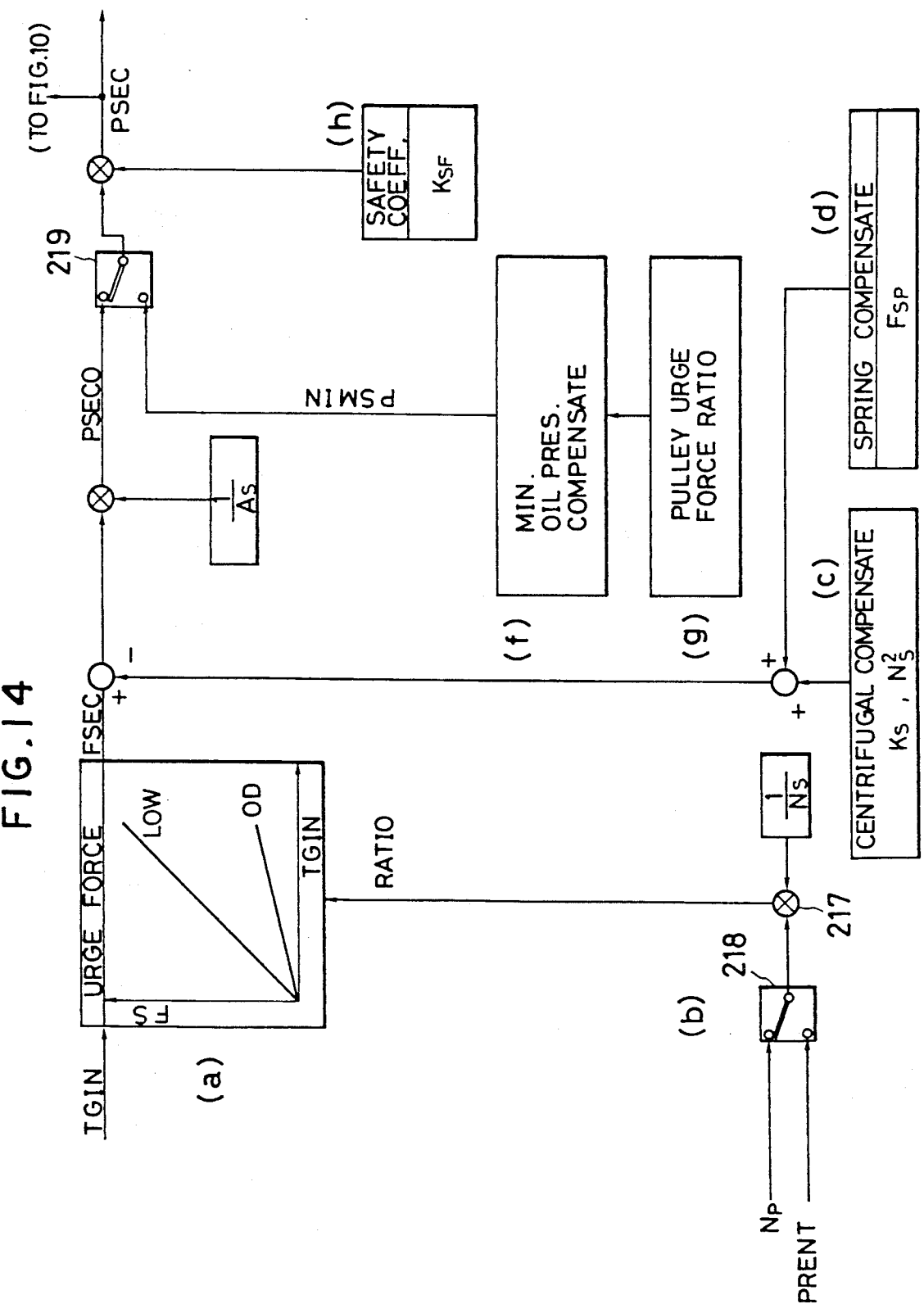

The pulley speed ratio RATIO can be obtained through a procedure as shown in FIG. 14.

As shown in FIG. 14(b), the control unit 78 compares the actual primary pulley speed Np with the target pulley speed PVEVT obtained through the step 220. A pulley urging force FSEC necessary to keep the pulley at a right position providing a desirable pulley speed ratio RATIO increases as the pulley speed ratio RATIO increases. If the actual primary pulley speed Np is greater than the target pulley speed PVEVT, the pulley speed ratio RATIO is Np/Ns.

Then, the pulley urging force FSEC is obtained through a map as shown in FIG. 14(a).

Centrifugal Hydraulic Pressure Compensation

Figure 19:
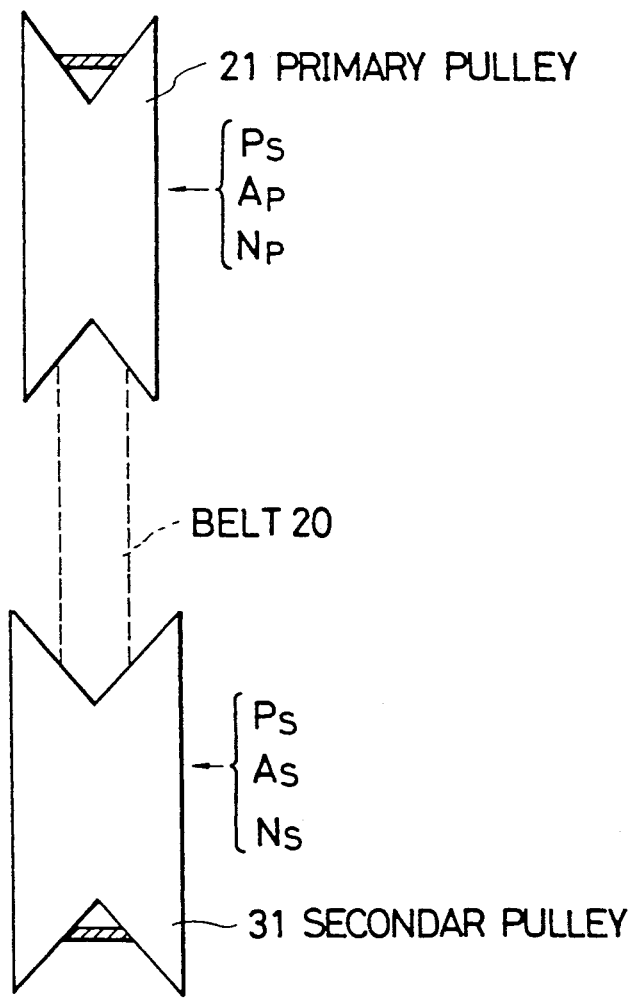
FIG. 19 is a conceptional illustration showing various factors acting on belt-pulley mechanism.
Figure 20:
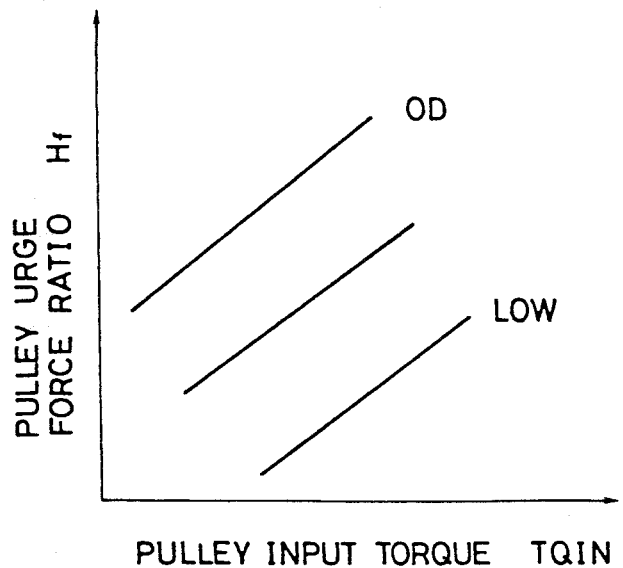
FIG. 20 is a graphical representation showing an input torque of the belt-pulley mechanism and a ratio of pulley urging forces between the primary and secondary pulleys.

As shown FIG. 19, the primary and secondary pulley 21 and 31 are subjected to pulley urging force Fp and Fs respectively as follows;

$$Fp = Ap*Ps + Kp*Np**2 \quad (1)$$

$$Fs = As*Ps + Ks*Ns**2 + Fsp \quad (2)$$

Wherein Kp, Ks are constant, each of second terms is a centrifugal force, third term Fsp of the formula (2) is a resilient force by the spring. A ratio Hf=Fp/Fs (3) between the pulley urging forces should be kept properly in order to carry out a proper shift stage operation of the belt-pulley mechanism as shown FIG. 20.

Figure 15:
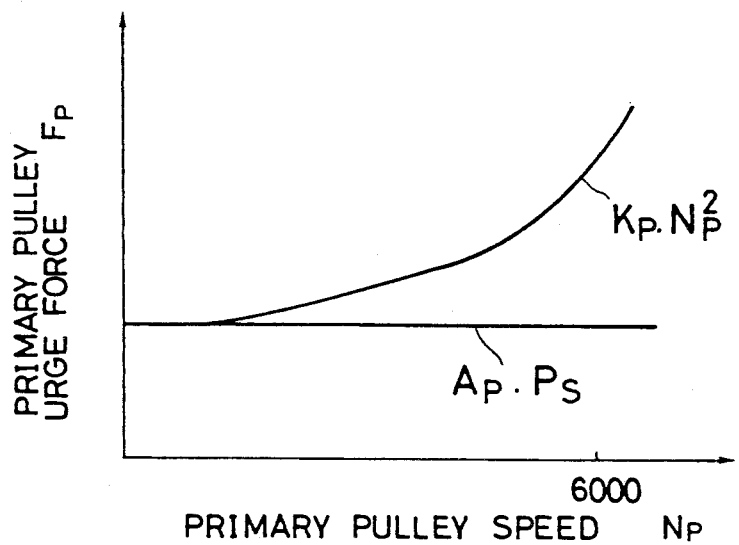
FIG. 15 is a graphical representation showing a relationship between a primary pulley urging force and a primary pulley speed.
Figure 16:
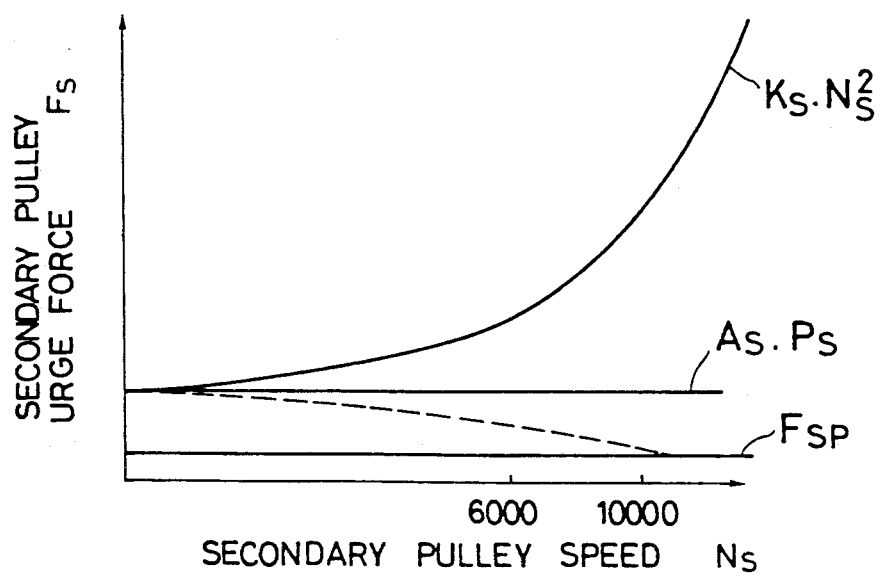
FIG. 16 is a graphical representation showing a relationship between a secondary pulley urging force and a secondary pulley speed.

FIG. 15 shows a property of the pulley urging force Fp of the primary pulley 21 relative to the primary pulley speed Fp. FIG. 16 shows the pulley urging force Fs of the secondary pulley 31 relative to the secondary pulley speed Ns. The centrifugal forces increase in proportion to a square of the pulley speed and act to urge the movable conical plate to the stationary plate. Therefore, it is desirable to reduce the line pressure Ps by an increment based on the centrifugal forces to keep the pulley urging forces Fp and Fs as constant as possible. The ratio of the effective area Ap of the primary pulley 21 to the effective area As is provided as follows;

$$Ap:As = 2:1$$

It is therefore noted that the ratio Hf is difficult to be kept at a constant value by controlling the line pressure Ps in order to compensate the centrifugal forces acting on the primary and secondary pulleys 21 and 31. In view of this, the line pressure Ps is controlled not to reduce below a minimum line pressure PSMIN. The value PSMIN is obtained through the formulas (1) through (3) as follows;

$$PSMIN = \{(Ks*Ns**2 + Fsp)*Hf - Kp*Np**2\}/(Ap - As*Hf) \quad (4)$$

As shown in FIG. 14(c) and (d), a pressure PSECO acting on the piston 36 of the secondary pulley 31 is obtained as follows;

$$PSECO = \{FSEC - (Ks*Ns**2 + Fsp)\}/As$$

A selector 219 selects a smaller one of the pressure PSMIN and PSECO. In step 219, a final line pressure PSEC can be obtained by multiplying the selected value by a safety coefficient Ksf.

Solenoid Control

Figure 17:
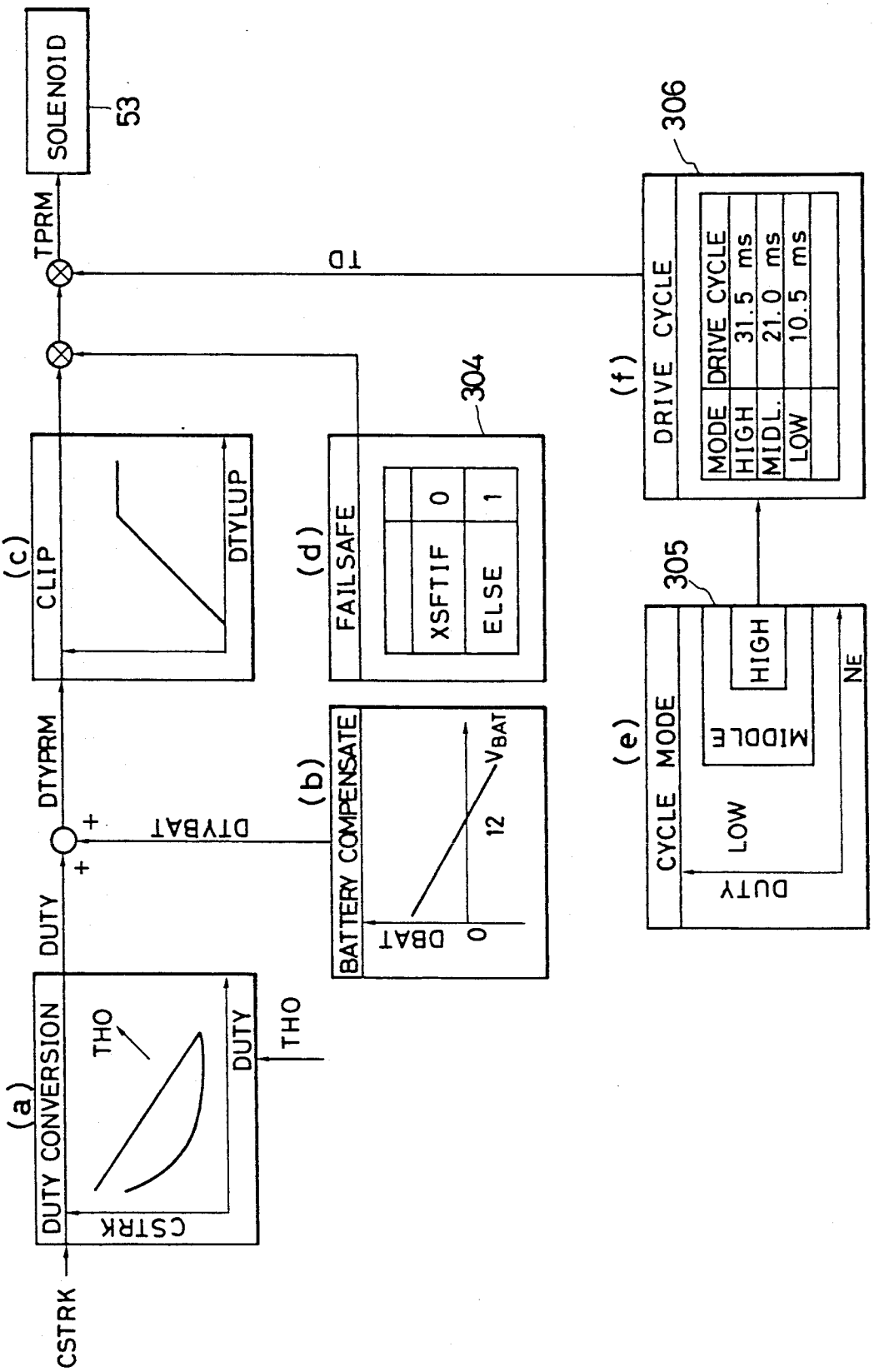
FIG. 17 is a block chart showing a procedure for obtaining the duty ratio of a solenoid valve.

As shown in FIG. 17(a), the signal CSTRK is converted to a duty signal. In this case, the duty signal increases as the oil temperature increases. As shown in step (b) of FIG. 17, a battery compensation is made. In FIG. 17(c), a clipping treatment is applied to the signal. In step (d), a fail-safe treatment is made wherein the flag XSFTIF memories an occurrence of a fail condition. In step (e) of FIG. 17, the control unit 78 decides a cycle mode of solenoid driving cycle on the engine speed Ne and the duty obtained through the map (a). In the illustrated embodiment, there are provided three cycle modes LOW(10.5 ms) MIDDLE(21.0 ms) and HIGH(31.5 ms) to suppress a pulsation of the pump output. As shown in step (f), the control unit 78 selects one of the cycle modes in accordance with the zone judgment. The cycle increases as the engine speed Ne or an output of the pump 40 increases.

Control Procedure

Figure 18:
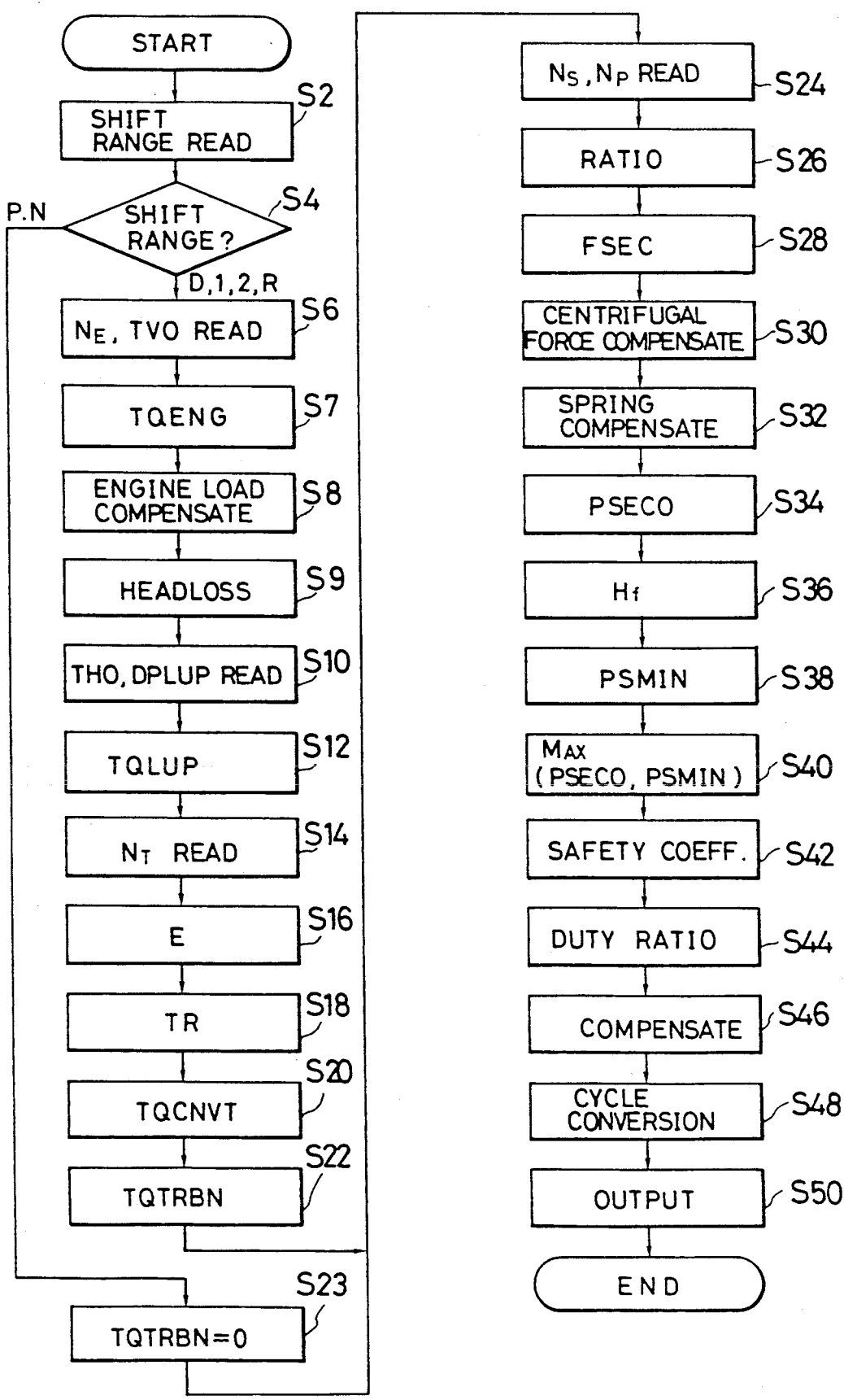
FIG. 18 is a flow chart showing a control by the control unit in accordance with the present invention.

Hereinafter there is described a control by the control unit 78 in accordance with FIG. 18.

In step S2, the control unit 78 reads a shift position RANGE from the sensor 82. When the shift position is in either P or N, the control unit 78 set the turbine torque TQTRBN at a value "0" and skips to step S24.

When the shift position is in D, 1, 2, or R, the control unit 78 goes to step S6 and reads the engine speed Ne, throttle opening TVO from the sensors 86 and 85. In step S7, the control unit 78 calculates the engine torque TQENG based on the engine speed Ne and the throttle opening TVO in accordance with FIG. 12(a). In step S8, the load compensation is made in accordance with FIG. 12(b). In step S9, the torque loss compensation is made based on the oil pump to get the engine output torque TQPUMP.

In step S10, the control unit 78 reads the oil temperature THO from the sensor 88 and calculates the initial value DPINT and the pressure difference DPLUP. The transmitting torque ratio Hlu is calculated from the pressure difference DPLUP in accordance with FIG. 13(b). In step S12, the transmitting torque TQLUP is obtained based on the engine torque TQPUMP and the transmitting torque ratio Hlu as follows;

$$TQLUP = TQPUMP \cdot Hlu$$

In step S14, the control unit 78 reads the turbine speed Nt from the sensor 87. In step S16, the pump turbine speed ratio E is obtained as follows;

$$E = Nt/Ne$$

Wherein the turbine speed Nt is equivalent to the primary pulley speed Np in FIG. 13(e) or a value Np*KLRRT. In step 18, the torque ratio TR is calculated. In step S20, the converter transmitting torque TQCNVT is calculated as follows;

$$TQCNVT = (TQPUMP - TQLUP) \cdot TR$$

In step S22, the total torque TQTRBN is calculated as follows;

$$TQTRBN = TQLUP + TQCNVT$$

Wherein the value TQLUP is a torque through the lock-up clutch and the value TQCNVT is a torque through the torque converter. By applying a compensation based on the planetary gear mechanism, the value TQIN is obtained.

In step S24, the pulley speed ratio RATIO (Np/Ns) is calculated based on the primary pulley speed Np and secondary pulley speed Ns from the sensors 83 and 84. In step S28, the pulley urging force FSEC is calculated from the values TQIN and RATIO. In step S30, and S32, the line pressure PSECO is obtained through FIG. 14(c) and (d) after the compensation of the centrifugal force and spring force. In step S36, the ratio Hf between the pulley urging forces in the primary and secondary pulleys is calculated through the formula (3). In step S38, the minimum line pressure PSMIN necessary to make a shift operation is calculated based on the formula (4). In step S40, the control unit 78 selects a greater one of the pressure PSECO and PSMIN. In step S42, a compensation is made based on the safety coefficient Ksf in accordance with the map shown in FIG. 14(h). In step S44, the line pressure PSEC is converted to the duty ratio. In step S46, the battery voltage compensation is made and the duty ratio is converted to the drive cycle in step S48. In step S50, a signal is produced to the solenoid.

Another Embodiment

Figure 21:
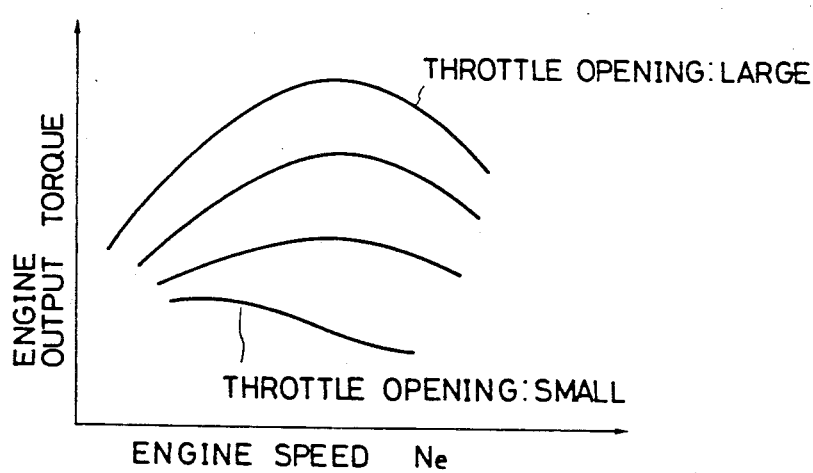
FIG. 21 is a chart showing a relationship between engine output torque, throttle opening and engine speed.
Figure 22:
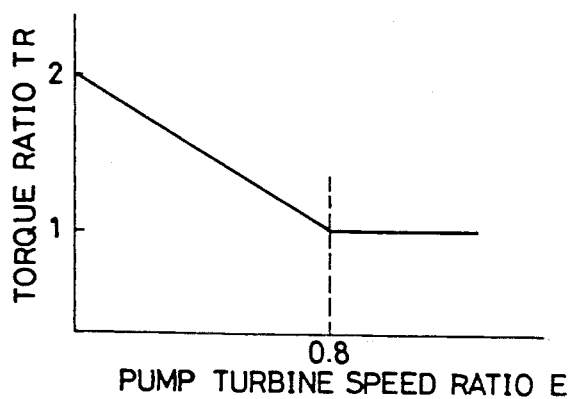
FIG. 22 is a chart showing a relationship between a torque ratio in the torque converter and a pump turbine speed ratio.
Figure 23:
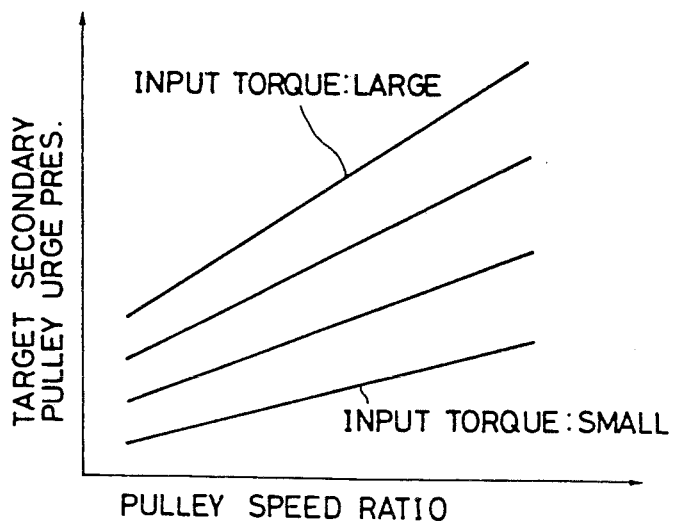
FIG. 23 is a chart showing a target secondary pulley urging pressure, pulley speed ratio and input torque of the belt-pulley mechanism.

In another preferred embodiment, the line pressure PSECO is obtained through maps as shown in FIGS. 21, 22 and 23. Namely, the engine output torque TQENG is obtained in light of the map shown in FIG. 21 in accordance with the engine speed Ne and the throttle opening TVO. The torque ratio TR is obtained based on the map shown in FIG. 22 in accordance with the pump turbine speed ratio E.

The torque ratio TR decreases as the pump turbine speed ratio E(Nt/Ne) between the engine speed Ne and the turbine speed Nt increases and converges toward 1 when the pump turbine speed ratio E takes about 0.8.

The input torque TQTRBN of the belt-pulley mechanism Z is calculated based on the torque ratio TR. After calculating the pulley speed ratio RATIO (Ns/Np) between the primary pulley speed Np and the secondary pulley speed Ns, the target pressure applied to the secondary chamber 37 to keep the pulley speed ratio Ratio is determined based on the map shown in FIG. 23 in accordance with the pulley speed ratio RATIO and the input torque TQRBN. There-after, the line pressure PSECO is determined based on the pressure of the chamber 37. Thus, the line pressure can be determined so as to properly correspond to the magnitude of the torque transmitted through the belt 20 so that slippage of the belt 20 can be effectively prevented.

In obtaining the lock-up clutch transmitting torque TQLUP, the torque converter torque TQCNVT may be calculated and the torque TQCNVT is subtracted from the engine output torque TQPUMP and treated by the torque ratio TR to get the lock-up clutch transmitting torque TQLUP.

The value TQTRBN denotes the output of the torque converter nicely. Therefore, the present invention can be employed as a turbine torque detector. The value TQLUP can be obtained by directly detecting a pressure difference between the front and back sides of the lock-up piston 6 by means of pressure sensors.

Further, the cycle mode of the solenoid may be determined merely based on either the output of the pump or the duty ratio.

The cycle mode control can be applied not only for the belt-pulley type steplessly transmission but also another type of transmission such as a multiple gear stage transmission.

The above technique that the line pressure is determined based on both the lock-up clutch transmitting torque and the torque converter transmitting torque can be applied not only for the belt-pulley type steplessly transmission but also for different type of transmission and a turbine torque detector driven by a hydraulic pressure.

It will be apparent that various modifications and improvements may be made based on the above descriptions by those skilled in the art without departing from the scope of the claims as attached.

We claim:

1. A steplessly variable power transmission comprising:
   a torque converter provided with a pump device, having an input member connected with an engine output member of an engine so as to receive an engine output torque, and a turbine device having an output member,
   belt-pulley type steplessly variable power transmitting means provided with a primary pulley device connected with the output member of the torque converter, a secondary pulley device constituting output means of the transmission and belt means connecting the primary pulley device with the secondary pulley device for transmitting a torque between the primary and secondary pulley devices with a desired pulley speed ration between the primary and secondary pulley devices,
   hydraulic control means for controlling effective diameters of the primary and secondary pulley devices to thereby change the pulley speed ratio between the primary and secondary pulley devices of the transmission steplessly, a control unit for calculating an output torque of the torque converter and the pulley speed ratio, based on speeds of said primary and secondary pulley devices, and line pressure control means for controlling a line pressure of the hydraulic control means in accordance with signals from the control unit so as to change the effective diameters.

2. A steplessly variable power transmission as recited in claim 1 wherein said engine output torque is obtained based on engine speed and a throttle valve opening.

3. A steplessly variable power transmission as recited in claim 1 wherein a torque ratio between an input torque and said output torque of the torque converter is provided based on a ratio of a speed of the turbine device relative to engine speed, said output torque of the torque converter being obtained based on the torque ratio.

4. A steplessly variable power transmission as recited in claim 3 wherein said line pressure is determined based on said output torque of the torque converter and said pulley speed ratio.

5. A steplessly variable power transmission comprising:

a torque converter provided with a pump device, having an input member connected with an engine output member of an engine so as to receive an engine output torque, and a turbine device having an output member, lock-up clutch means provided in the torque converter for directly connecting said input member with the output member of the turbine device so as to transmit said engine output torque directly from the input member to the output member of the turbine device in a predetermined engine operating condition, belt-pulley type steplessly variable power transmitting means provided with a primary pulley device connected with the output member of the turbine device, a secondary pulley device constituting output means of the transmission and belt means connecting the primary pulley device with the secondary pulley device for transmitting a torque between the primary and secondary pulley devices with a predetermined pulley speed ratio between the primary and secondary pulley devices, hydraulic control means for controlling effective diameters of the primary and secondary pulley devices to thereby change the speed ration between the primary and secondary pulley devices of the transmission steplessly, a control unit for calculating a magnitude of a clutch torque transmitted through the lock-up clutch means and a magnitude of a converter torque transmitted through the turbine device, and line pressure control means for controlling a line pressure of the hydraulic control means in accordance with signals from the control unit, representing the clutch torque and converter torque so as to change the effective diameters.

6. A steplessly variable power transmission as recited in claim 5 wherein said clutch torque is obtained based on the engine output torque and an engaging condition of the lock-up clutch means.

7. A steplessly variable power transmission as recited in claim 5 wherein said converter torque is obtained based on the engine output torque and a torque ratio between the input member and the output member of the turbine device.

8. A steplessly variable power transmission comprising:

a torque converter provided with a pump device, having an input member connected with an engine output member of an engine so as to receive an engine output torque, and a turbine device having an output member, lock-up clutch means provided in the torque converter for directly connected said input member with the output member of the turbine device so as to transmit said engine output torque directly from the input member to the output member of the turbine device in a predetermined engine operating condition, and a control unit for calculating a magnitude of a clutch torque transmitted through the lock-up clutch means and a magnitude of a converter torque transmitted through the turbine device, and for processing signals representing the clutch torque and converter torque so as to calculate a total torque transmitted through the torque converter.

9. A steplessly variable power transmission as recited in claim 8 wherein said clutch torque is obtained based on the engine output torque and an engaging condition of the lock-up clutch means.

10. A steplessly variable power transmission as recited in claim 8 wherein said converter torque is obtained based on the engine output torque and a torque ratio between the input member and output member of the turbine device.

* * * * *